March 24, 1953 L. KRAFFE DE LAUBAREDE 2,632,203
METHOD AND APPARATUS FOR EXTRUDING
THERMOPLASTIC MATERIALS
Filed Feb. 17, 1950
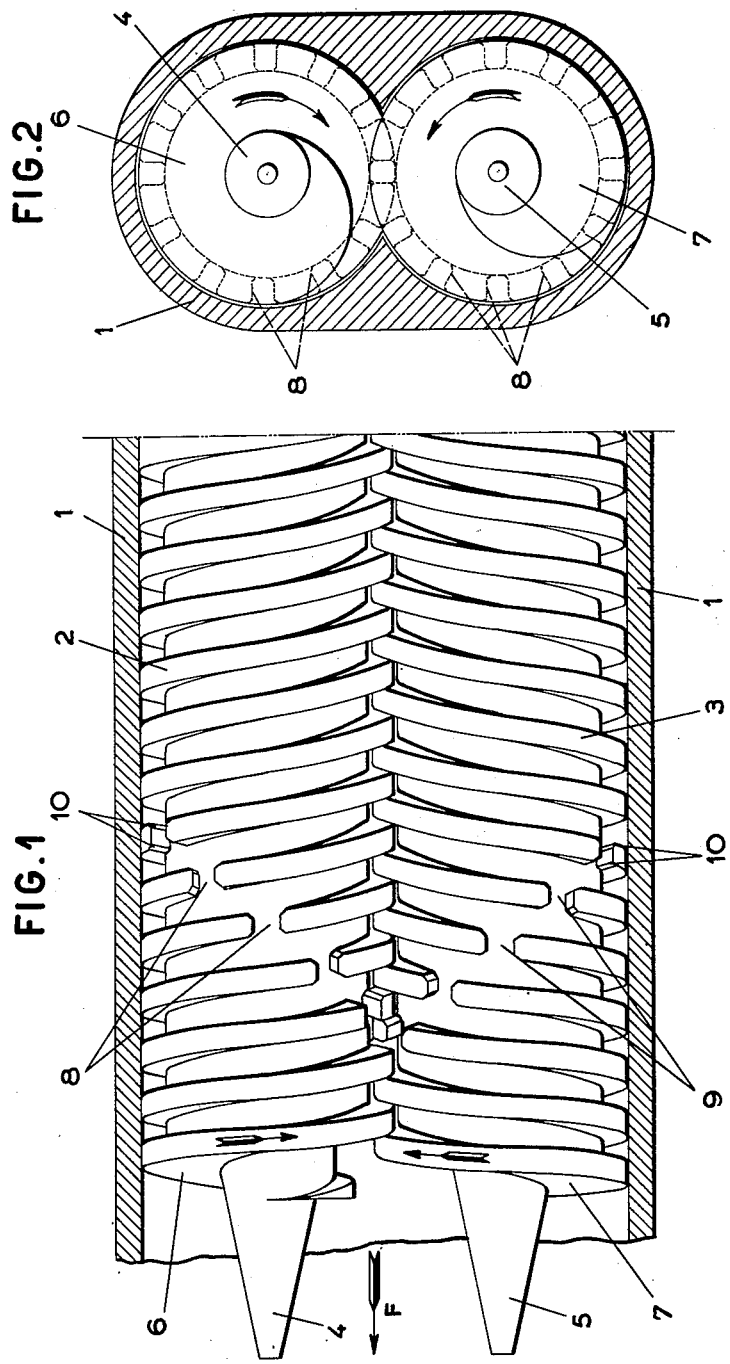
INVENTOR
LEONCE KRAFFE DE LAUBARÈDE
BY
HIS ATTORNEYS Patented Mar. 24, 1953

2,632,203

UNITED STATES PATENT OFFICE 2,632,203

METHOD AND APPARATUS FOR EXTRUDING THERMOPLASTIC MATERIALS

Léonce Kraffe de Laubarède, Paris, France

Application February 17, 1950, Serial No. 144,722
In France February 19, 1949

3 Claims. (Cl. 18—12)

Many screw devices are known which are used, in machines for extruding and injecting plastic materials, for the purpose of feeding the material into a compression chamber which supplies a die or a nozzle for injecting the material into a mould.

The general principle utilised in these devices for working the material and putting it under pressure in a state as homogeneous as possible consists in forcing the material by means of a single screw or by a number of screws having interengaging threads, in a leak-proof casing in contact with which the screw-threads slide with a minimum of play, and in offering resistance to the movement of the material by providing for it, at the end of its travel or in the compression chamber itself, a passage of continuously decreasing cross-section. Such a process, in many cases, gives satisfactory results with thermoplastics but a serious disadvantage sometimes arises with certain plastics; the material, mixed with plasticisers and progressively heated during its travel, tends to evolve gases within the gelling material before it reaches the compression chamber. The result is frequently lack of homogeneity in the material fed to the die or the injection nozzle, and, therefore, costly malformations and scrappings.

The object of the present invention is to overcome these disadvantages. Its subject is the new industrial product constituted by a screw-feeding device for thermoplastics and analogous products, which device functions at the same time to work the material and to homogenise it, eliminating every risk of gaseous inclusions in and heterogeneity of the delivered material, characterized by the fact that it comprises at least one feeding screw having interrupted threads over the last part of its length near the compression chamber and from the start of the region in which the phenomenon of gelling starts to occur.

Experience shows that, under the conditions produced by the device forming the subject of the invention, the lack of homogeneity of the material is totally eliminated; the breaches formed in the screwthreads contribute to the working, and everything takes place as if the gases or vapours which might be formed were evacuated backwards over the path which is open to them as a result of the interruptions in the screwthreads of the front part of the feeding screws.

In a preferred embodiment, a device is used which comprises two screws of opposite hand with their screwthreads in engagement and which turn in opposite senses, but it is to be understood that a single screw or a greater number of screws can be used and that these screws can be of regular or of variable pitch, be cylindrical or conical or of any other suitable shape.

There will now be described, by way of illustration of the possibilities of the carrying out of the invention and without thereby introducing any limitation on the scope of the invention, one embodiment chosen as an example and shown in the accompanying diagrammatic drawing in which:

Fig. 1 is a fragmentary view in axial section of a two-screw device with part of the casing broken away;

Fig. 2 is an end view of the device of Fig. 1.

I designates a casing the internal shape of which is adapted to that of two screws 2 and 3, one having a right hand thread, the other a left hand thread, these two screws being interengaged and turning oppositely in order to cause the plastic material to be driven in the direction of the arrow F towards the compression chamber and through a grid (not shown) having orifices for the passage of the points 4 and 5 of the screws.

The forward end 6—7 of the threads of the screws 2—3 is full but a number of following threads are formed with breaches 8—9. The width and depth of these branches 8—9 can vary from one thread to another both as to the shape and as to total cross-section. The interrupted threads reach as far as the region in which the material starts to gel and the section of the breaches is preferably progressively increased as this region is approached. In this way, the working of the material is facilitated, the material having a tendency to move backwards through the breaches 8 and 9 but being prevented from so moving by the neighbouring thread when the breaches 8 and 9 are disposed along a helical axis. However, any other disposition may be adopted, for example, a staggered disposition, or even a straight line disposition, and the number of breaches per screwthread can be variable. Each disposition can be of advantage in the case of a particular plastic material. At the same time as the material is worked between the breaches 8—9, the gases and vapours, which may have been evolved in the mass, are expelled backwards into the zone in which the material is not yet gelled.

The teeth formed by the interruption of the threads at the level of the breaches 8—9 are preferably laterally chamfered at 10 in order to facilitate the lamination of the material against the radial faces of the screwthreads and, at the same time, the homogeneity of the material delivered from the exit from the feeding device is improved.

It will be understood that various alterations, improvements or additions can be made to the described embodiment or certain components can be replaced by components playing an equivalent part, without thereby departing from the general economy of the invention.

What I claim is:

1. The method of working and feeding thermoplastic material to a compression machine which comprises heating and working the material while advancing it in the form of a helix in a closed space until it gels, permitting backward escape of gas from said material as it gels under heat, and circulating said gas through the ungelled material in the direction opposite to that in which it is moving, whereby the gelled material is improved in homogeneity and texture toward the outlet end of its helical movement.

2. A feeding device for an extruding machine for thermoplastic materials, said device comprising a mixing, heating and compression chamber having a casing, at least one feeding screw adapted to rotate in said casing with a minimum of clearance, means for rotating said screw, and means for heating said casing in a zone where gelling of said materials occurs, said feeding screw having its thread interrupted by notches in a portion of the length thereof extending from the zone of said heating means to a thread turn adjacent to the output end of said screw whereby gas is permitted to escape in the direction opposite to the output end of said screw, the helical lengths of said notches increasing progressively from the delivery end of said screw towards its inlet end.

3. A feeding device for an extruding machine for thermoplastic materials, said device comprising a mixing, heating and compression chamber having a casing, at least one feeding screw adapted to rotate in said casing with a minimum of clearance, means for rotating said screw, and means for heating said casing in a zone where gelling of said materials occurs, said feeding screw having its thread interrupted by notches in a portion of the length thereof extending from the zone of said heating means to a thread turn adjacent to the output end of said screw whereby gas is permitted to escape in the direction opposite to the output end of said screw, said notches being so spaced that a first portion of the thread at the outlet end of said screw has a length greater than the outer periphery of said shaft, a plurality of successive portions of said thread extending axially inward from said first portion as far as the plane where gelling in the treated material starts occurring each have a length less than said outer periphery, and a final continuous thread portion extends to the inlet end of said screw.

LÉONCE KRAFFE DE LAUBARÈDE.

REFERENCES CITED

The following references are of record in the file of this patent:

UNITED STATES PATENTS

| Number | Name | Date |
|---|---|---|
| 960,143 | Anderson | May 31, 1910 |
| 1,732,281 | Robinson | Oct. 22, 1929 |
| 2,200,997 | Royle | May 14, 1940 |
| 2,360,984 | Schmitz, Jr. | Oct. 24, 1944 |